Figure 1:
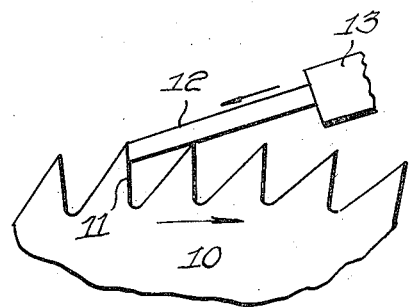

Aug. 24, 1948.                H. R. RAFTON                2,447,532
                    TREATMENT OF PIGMENT COMPRISING
                            CALCIUM CARBONATE
                         Filed Dec. 27, 1946

Inventor
HAROLD R. RAFTON

By C. R. Parker
Attorney

Patented Aug. 24, 1948

2,447,532

UNITED STATES PATENT OFFICE 2,447,532

TREATMENT OF PIGMENT COMPRISING CALCIUM CARBONATE

Harold R. Rafton, Andover, Mass., assignor to Raffold Process Corporation, a corporation of Massachusetts Application December 27, 1946, Serial No. 718,649

10 Claims. (Cl. 23—66)

My invention relates to the treatment of pigment, particularly calcium carbonate and more particularly artificially prepared calcium carbonate.

The present application is a continuation of my co-pending application Serial No. 449,492, filed July 2, 1942, now abandoned, to which cross reference is hereby made and the subject matter of which is made a part hereof, which latter application is a continuation in part of my then co-pending application Serial No. 436,196, filed March 24, 1942, now matured into Patent No. 2,383,509, issued August 28, 1945. Reference is further made to my prior applications Ser. No. 453,469, filed August 3, 1942, now abandoned, Ser. No. 455,367, filed August 19, 1942, now abandoned, and Ser. No. 584,158, filed March 22, 1945, now abandoned; to my co-pending applications Ser. No. 706,907, filed October 31, 1946, and Ser. No. 740,831, filed April 11, 1947; and to my Patent 2,385,379, all directed to related subject matter.

The principal object of my invention is the treatment of a pigment, particularly calcium carbonate and more particularly artificially prepared calcium carbonate, to impart specific and controlled characteristics.

Other objects and advantages of this invention will become apparent during the course of the following description.

Calcium carbonate may be artificially prepared in a variety of ways, all of which are well known. Examples of some of the common methods are: by reaction of lime, or calcium hydroxide, and carbon dioxide; by the causticizing reaction, e. g. the reaction of sodium carbonate and lime; by the reaction of an alkali metal carbonate such as sodium carbonate and a soluble calcium salt such as calcium chloride; by the elimination of carbon dioxide from calcium bicarbonate solution by heat or reduction of pressure, or by reaction of calcium bicarbonate with lime; or by any combination of the above. Sodium bicarbonate is sometimes utilized in the reaction, as is also potassium or ammonium carbonate, and sodium, potassium or ammonium hydroxide may be present in certain cases. When I speak of artificially prepared calcium carbonate, I mean calcium carbonate artificially prepared by the above mentioned or other known methods in contradistinction to naturally occurring calcium carbonate, such as marble, limestone, natural chalk, marl, or refined forms of these materials such as the comminuted form, usually ground to varying degrees of fineness, and which may be subjected to mechanical, air or water separation or classification, and may be otherwise purified if desired.

The calcium carbonates artificially prepared vary considerably in physical characteristics and possibly also in chemical constitution and crystalline form or other form. Some may be relatively coarse in particle size, others may be relatively fine, examples of the latter being the calcium carbonates made by the processes disclosed in the patents issued to Rafton and Brooks, No. 2,058,503, of October 27, 1936, and No. 2,062,255, of November 24, 1936. In many instances a given artificially prepared calcium carbonate although entirely satisfactory from the standpoint of certain characteristics such for example as particle size, alkalinity, softness and the like, may be unsatisfactory because of high adhesive requirement, high oil absorption, or other characteristic. In many cases such unsatisfactory characteristic makes it infeasible, if not impossible, to market an artificially prepared calcium carbonate otherwise satisfactory or highly desirable for certain uses, or if possible to market it at all, only at a price lower than it would otherwise command.

As disclosed in my co-pending application Serial No. 346,661 filed July 20, 1940, now matured into Patent No. 2,385,379, issued September 25, 1945, I have discovered that by the momentary application of pressure, in certain cases accompanied by momentary attrition, I am able to impart to artificially prepared calcium carbonate certain new and in same cases unique characteristics, such as lowered oil absorption, lowered adhesive requirement, and the like.

As disclosed in my co-pending application Serial No. 436,196 filed March 25, 1942, now matured into Patent No. 2,383,509, issued August 28, 1945, I have also discovered that by the passage of artificially prepared calcium carbonate at high velocity through a nozzle and if desired against a target, I am also able to impart to artificially prepared calcium carbonate similar new and in some cases unique characteristics. As disclosed in said patent, the target may be stationary, or may be moving at slow or high velocity as desired, preferably in a direction opposed to the jet direction, in the case of a high velocity target moving in an opposed direct an effect of greater magnitude being obtained than with a slow velocity target or a stationary target. In said patent, while claims are directed broadly to the use of a target, no claims are directed specifically to the use of a moving target, nor particularly to a target moving at high velocity, and it is one of the objects of the present application to present such claims.

Whereas good results can be obtained by the use of a high speed jet impinging against the striking surface or surfaces of the element which is moving at high velocity, the jet moving in a direction opposed to the direction of motion of the striking surface or surfaces, I have also discovered, contrary to what would be expected, that I can achieve similar and in many cases better results by employing an element, with striking surface or surfaces, moving at high velocity which surface or surfaces do not strike a jet of slurry in a direction opposed thereto but rather in a direction parallel or substantially parallel to the direction of flow of the jet. Although jets of higher pressure may be used if desired with this method, it is very advantageous to use jets of relatively low pressure therewith, which eliminates the necessity for high pressure pumps with their high cost and valve troubles which may inhere therein, substituting therefor relatively lower pressure pumps, the combination of which with the element moving at high velocity being far less expensive to employ and much simpler to maintain. Moreover in certain cases no pump at all may be required, but this usually results in a lowered efficiency. The results obtained by the relatively lower pressure jet, and high velocity element striking the jet substantially parallel to the direction of the jet, are in certain cases superior to the results obtained with the high pressure jet in a direction opposed to the striking surface or surfaces of the high velocity element, and in general, the indications are that the former arrangement produces results of greater utility than the latter, that it is much more economical, and that its efficiency is greater. Moreover the effects on the artificially prepared calcium carbonate by passage of the slurry through the nozzle, and by striking it by the element, in the case of the relatively low presure jets I prefer to employ, are not additive but substantially parallel; and when a jet is used of a relatively low velocity such that the effect obtained by the element is the same or greater than that obtained by passage through the nozzle itself, any nozzle effect has no influence on the intensity of the effect produced in the artificially prepared calcium carbonate by striking it with the striking surface or surfaces of the element.

By my present process I have been able to reduce greatly the adhesive requirements of artificially prepared calcium carbonates, when used, for example, in coated paper or in water paints. By my present process, I have also been able to reduce the oil absorption of artificially prepared calcium carbonates, when used for instance in paints, enamels and other coatings, and putties; and in general have been able to impart greatly improved qualities to artificially prepared calcium carbonates. By my present process I have also been able to reduce the adhesive requirements and oil absorption of naturally occurring calcium carbonates, and also to modify certain other of their properties.

In my above referred to Patent No. 2,385,379, I have described the application of the process thereof to dry material, to somewhat moist material, to material in paste form, and even to material in the form of a slurry, the application of the process to material in the two latter forms being much more difficult. My process claimed herein, as well as the process claimed in my above referred to Patent No. 2,383,509, on the other hand, are both particularly applicable to aqueous slurries of artificially prepared calcium carbonate, but become increasingly difficult of operation as the water content of the artificially prepared calcium carbonate is decreased below certain limits, e. g. as the material approaches the paste-like condition, and as a matter of fact, my preferred method of operating my process claimed herein, as well as the process claimed in my Patent No. 2,383,509, is on an aqueous slurry, preferably as thick as may flow or as it may be feasible to pump. As naturally occurring calcium carbonates do not respond to the process of my Patent No. 2,385,379 nor to the process claimed in my Patent No. 2,383,509, if I desire to treat naturally occurring calcium carbonates, I am confined to the use of the process claimed herein.

My process claimed herein, as well as the process claimed in my Patent No. 2,383,509, lend themselves particularly to incorporation in the operation of manufacturing artificially prepared calcium carbonate, inasmuch as in most cases the calcium carbonate after manufacture exists either in the form of a slurry, or as a paste such as a filter cake which can very readily be diluted into a slurry. Furthermore, in certain instances, there may be a point in the manufacturing operation in which artificially prepared calcium carbonate, after it has been produced, may be present in a somewhat crude form requiring subsequent refining, purification or the like, and it is very often entirely feasible to incorporate either process as a step in the operation at some such point after the artificially prepared calcium carbonate has been formed.

It is to be understood that either process is not limited to the methods of use mentioned above herein, as of course artificially prepared calcium carbonate previously made, existing, for example, either in dry, paste or slurry form, can be treated by either process. For example artificially prepared calcium carbonate procured in a dry form, may be wetted up to a slurry, subjected to either process, and used as a slurry, or after adding water, or dewatering, or may be dried before use. However, as between my process claimed in my Patent No. 2,383,509 and my process claimed herein, since the latter is more economical as well as in most cases more efficient, that is the process I prefer to employ.

Calcium carbonates prepared by artificial methods, of all degrees of fineness, respond to my process claimed herein. Naturally, however, the absolute magnitude of the effect obtained is not the same or even similar with every sample. A pigment comprising artificially prepared calcium carbonate may of course be a pigment in which artificially prepared calcium carbonate is the sole constituent of the pigment, or it may be a pigment in which an additional constituent or constituents is present, such for example as magnesium hydroxide in the case of calcium carbonate magnesium hydroxide and magnesium basic carbonate in the case of calcium carbonate magnesium basic carbonate. Such also respond to my process, as do also naturally occurring calcium carbonate, such as limestone, marble, marl and chalk, for example in comminuted form such as they occur commercially, although these latter materials do not appear to be affected by my process to as great degree as are artificially prepared calcium carbonates.

My process claimed herein comprises striking a slurry of pigment comprising calcium carbonate with a moving element provided with a striking surface or surfaces, i. e. with a member or members adapted for striking. The moving element is preferably a rotating element rotating at high speed. There are three principal adaptations of my process. In the first adaptation, the slurry is presented for contact with the striking surface or surfaces of the moving element in bulk, and in the second and third adaptations, the slurry is in the form of a stream or streams, such as a jet issuing from a nozzle directed in the desired direction at the striking surface or surfaces of the moving element. The methods I employ of testing for adhesive requirement and oil absorption of the calcium carbonate are essentially similar to those employed in my above referred to patents, and will be again referred to later herein.

While I may practice my invention, e. g. by the use of a rotating i. e. rotor element, for instance a wheel, or disc, I prefer to use a disc, preferably of metal. The moving element may have projections, serrations, indentations, blades, teeth or other striking surface or surfaces on its periphery, or on one or both of its end faces; and these may be integral with or rigidly attached to the moving element, or attached as by pins, hinges, or the like, and may swing out as by centrifugal force. While the disc may be disposed in any position desired, it is preferably vertically disposed with a horizontal drive shaft.

Figure 2:
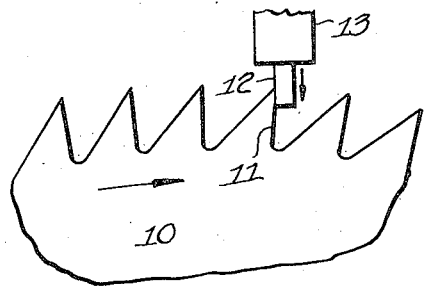

In accordance with the first adaptation of my invention, the striking surface or surfaces of the rotating element may strike against a supply of the slurry in bulk such as in a trough or other container. In accordance with the second adaptation of my invention they may strike against a jet or jets of the slurry, which may be directed against the teeth or other striking surfaces, preferably substantially in a plane of rotation of the element and as nearly tangential to the rotating element and as nearly at right angles to the leading faces of its striking surfaces as may be feasible, and in a direction opposed to that of the rotation of the rotating element, at any desired speed but preferably at high speed, as disclosed but not claimed in my Patent No. 2,383,509. This is illustrated in Figure 1 which will be described later herein. In accordance with the third adaptation of my invention, the striking surfaces of the moving element may strike against a jet or jets of slurry directed in a plane or planes passing substantially through the axis of rotation of the rotating element and preferably directed in a direction substantially radial to the rotating element and toward its center of rotation, and substantially parallel to the leading face or faces of its striking surface or surfaces, which are preferably disposed radially on the rotating element. This is illustrated in Figure 2 which will be described later herein. This third adaptation is the adaptation of my process which I prefer to practice.

The simplest disc with striking surfaces which may be obtained commercially, and one which has many practical advantages, is a circular saw. Inasmuch as metal cutting circular saws, of certain types at any rate, are designed to operate at much higher peripheral speeds than are wood cutting circular saws, I prefer to use a metal cutting circular saw made of suitable alloy steel which will have strength amply sufficient to withstand the peripheral speed I have found desirable in the practice of my invention.

The teeth of the saw employed may be of any pattern desired, but it will be apparent that teeth with their advancing, i. e. leading, faces on radial planes of the saw at right angles to the planes of rotation of the saw constitute striking surfaces which give the greatest blow to a slurry brought into contact therewith, and thus I prefer to use teeth of this type. The rear faces of the teeth are conveniently made sloping away from the leading faces at an angle of approximately 45°. In conducting some of the experimental work which is disclosed herein, I employed such saws, 16″ in diameter with teeth ½″ apart (or "point to point") and ⅜″ from point of tooth to lowest point of the gullet, mounted on a horizontal shaft so that the saw revolved in a vertical plane. The shaft was driven by V-belts from a motor, with pulleys which could be changed to give any desired speed, with a top peripheral speed of the saw of somewhat above 28,000 ft. per min., (467 ft. per sec.). The saw was enclosed in a casing with a top, parallel sides and a V bottom. This V bottom could be employed as a trough into which a supply of slurry could be introduced for the saw to strike against; or by a valved opening at the apex of the V, it could be used to drain off the slurry which had been introduced into the path of the saw by one or more nozzles fed from a pipe which projected through the casing, and which the saw had already struck.

I shall now illustrate my invention, using pigment comprising artificially prepared calcium carbonate as the material treated because more intense effects are obtained therewith than with naturally occurring calcium carbonate. I shall, however, later herein also illustrate my invention using naturally occurring calcium carbonate as the material treated.

To illustrate the results obtained in the practice of my invention in accordance with its first adaptation, wherein the slurry is presented for contact with the striking surface or surfaces of the moving element in bulk form, I cite a series of tests I have conducted. The pigment comprising artificially prepared calcium carbonate used in this case was a sample of calcium carbonate magnesium hydroxide (obtained by causticizing sodium carbonate with slaked dolomitic lime) diluted with water to give a slurry of approximately 220 grams per litre. The slurry was contained in the V-bottom of the saw casing described above. The volume used was 16 litres, which came up 2¼″ on the vertical radius of saw when the saw was still, and the saw was run in this at a peripheral speed of 470 ft. per sec. The saw employed was one of the 16″ diameter saws previously described herein, ⅛″ in thickness.

Table I lists the series of tests made with this apparatus. The original test was run for 1 minute, then the saw was stopped and 500 cc. of slurry removed for test purposes; the saw was then started and run for another minute, after which the saw was stopped and 500 cc. more of slurry was removed for test purposes; and this general procedure was repeated until the tests were finished, varying only as to the length of time the saw was run. (The individual illustrative tests reported herein will be serially numbered for convenience.)

Table I

| Test No. | Total time treatment in minutes | Volume treated, litres | Height of slurry on saw, inches on vertical radius | Adhesive requirement, per cent | Per cent reduction in adhesive requirement, based on original as 100% |
|---|---|---|---|---|---|
| 1 | | | | 26 | |
| 2 | 1 | 16.0 | 2¼ | 20 | 23 |
| 3 | 2 | 15.5 | 2⅛ | 19 | 27 |
| 4 | 4 | 15.0 | 2 | 18 | 31 |
| 5 | 8 | 14.5 | 1⅞ | 17 | 35 |
| 6 | 16 | 14.0 | 1¾ | 17 | 35 |

In Table I, test No. 1 with no time reading was the original pigment prior to submission to the process (as are similar tests in all succeeding tables). The adhesive employed to determine adhesive requirement in the tests of the above table, as well as in the tests of all other tables herein, was casein dissolved in an aqueous alkaline solvent.

It will be noted that under the conditions of these tests, a 23% reduction in adhesive requirement based on the original as 100% was obtained in one minute, and that this gradually increased until a reduction of 35% was obtained in 8 mins., but beyond this no further reduction was obtained.

A further test was made with the same apparatus as above but in which 9½ litres of slurry was employed, which extended up on the vertical radius of the saw only ⅜", i. e., merely as high as the gullet of the bottommost saw teeth. A run was made for 2 minutes and then after withdrawing somewhat in excess of 500 cc. of slurry for a sample, which lowered the immersion of the saw to approximately ⅛", the run was continued for another 2 minutes, and then a further sample of slurry was withdrawn for test. The test on the final sample of slurry withdrawn showed no reduction in percent adhesive requirement. Thus it is necessary, in order to get results by this particular adaptation of my method to have the saw immersed sufficiently deeply in the slurry when it is in a still condition so that the windage does not sweep the slurry away from contact with the teeth of the saw while the saw is in motion.

The first adaptation of my method is uneconomical from the power standpoint because of the fact that a large proportion of the energy imparted to the moving element is employed in pumping the slurry around in the casing uselessly and in pumping around the air which gives the saw its "windage." In an endeavor to improve its power efficiency I investigated the possibility of operating with the striking surfaces of the moving element entirely immersed in slurry, which would thus avoid the difficulty from windage as no air would be present. However, in order to do this, it would be necessary to immerse the saw completely in the slurry, which would thus increase the power required for pumping considerably. To avoid this, it was necessary to obtain an arrangement whereby the slurry in relatively small volume could be confined in such a way so that it could come in contact only with the striking surfaces of the moving element rather than with the entire moving element.

To try this out, equipment was used employing a steel disc with vanes on either side of its periphery in the nature of flat turbine blades. The disc was mounted on a horizontal shaft to rotate vertically between two contacting side plates recessed for close clearance with the disc. In the plates, at the circle of the blades, was cast a circumferential groove, extending around approximately 340° of the arc of the circle, which thus provided an annular space in which slurry could be contained for contact with the blades of the disc almost for the entire circumference of the disc. This portion of about 20° of arc between the two ends of the annular space was provided as a partition so that the slurry could be fed in at one end of the annular space by means of an inlet pipe and let out at the other end of the annular space by means of an outlet pipe, continuously. The outlet pipe was controlled by a valve, and the rate and pressure at which the slurry passed through the annular space and out of the outlet pipe was regulated by this outlet valve.

Several tests were made employing this apparatus. The pigment comprising artificially prepared calcium carbonate used was calcium carbonate magnesium hydroxide, the same sample as used in tests recorded in Table I but of a different concentration, namely approximately 342 g. p. l. Table II embodies the results of these tests. They were run with the outlet valve partly throttled to give 105 lbs. pressure, the disc being driven at a peripheral speed of 45' per second.

Table II

| Test No. | No. passes | Adhesive requirement, per cent | Per cent reduction in adhesive requirement, based on orig. as 100% |
|---|---|---|---|
| 1 | | 26 | |
| 7 | 1 | 24 | 8 |
| 8 | 10 | 22.5 | 13 |
| 9 | 20 | 21 | 19 |
| 10 | 50 | 20 | 23 |
| 11 | 100 | 17.5 | 33 |
| 12 | 200 | 17.5 | 33 |

Table II indicates that a marked reduction in the adhesive requirement is obtained, almost as good as with the apparatus used for the tests in Table I. As much poorer results would ordinarily be obtained with the much slower peripheral speed employed in the tests of Table II compared with that used in the tests of Table I, this indicates that the confining of the slurry to be treated to a small space around the striking surfaces of the moving element is a more efficient method of presenting the slurry to the moving element than that of presenting it in an open trough.

As the concentration of the slurry used increases, the slurry approaches a paste-like condition and thus is not amenable to handling in the apparatus I use. I have, however, been able to employ much more concentrated slurries than would otherwise be possible by the addition of a thinning agent to a paste of pigment and water, whereby the paste is converted to a liquid consistency. A small amount of casein is very useful in this connection as a thinning agent.

There are cited in Table III two series of tests employing the apparatus used in the tests shown in Table II. The pigment used in both series is calcium carbonate magnesium hydroxide, but of a different commercial lot from that employed for the tests in the previous tables. In both series of tests, casein which was dissolved in an aqueous alkaline solution was added to the pigment in paste condition to give a slurry, the casein being added in the amount of 1% based on the dry weight of the pigment, in order to give a suitable fluidity.

*Table III*

| Test No. | No. of passes | Outlet valve throttled to give pressure, lbs. per sq. inch | Peripheral speed of the disc, ft. per sec. | Pigment suspension, g. p. l. | Adhesive requirement, per cent | Per cent reduction in adhesive requirement, based on orig. as 100% |
|---|---|---|---|---|---|---|
| 13 | | | | | 20.75 | |
| 14 | 5 | 72 | 33 | 633 | 20.75 | 0 |
| 15 | 10 | 79 | 33 | 633 | 18.5 | 11 |
| 16 | 15 | 80 | 33 | 633 | 18.5 | 11 |
| 17 | 20 | 75 | 33 | 633 | 17.5 | 16 |
| 13a | | | | | 18.5 | |
| 18 | 1 | 105 | 45 | 725 | 18 | 3 |
| 19 | 12 | 105 | 45 | 725 | 16 | 14 |
| 20 | 20 | 105 | 45 | 725 | 16 | 14 |
| 21 | 50 | 105 | 45 | 725 | 15.5 | 16 |
| 22 | 96 | 105 | 45 | 725 | 14 | 24 |

In Table III, test No. 13 is the original pigment used for tests Nos. 14–17 inclusive, and test No. 13a is the original pigment used for tests Nos. 18–22 inclusive. 13a is the same pigment as 13, the only difference between them being that they were made up with the small amount of casein used, at different times. As is disclosed in detail later herein, I have found that adding a small amount of casein to artificially prepared calcium carbonate, and allowing the mix to stand, sometimes lowers the adhesive requirement of the calcium carbonate, this amount of lowering varying somewhat with conditions, and sometimes varying somewhat even when conditions appear to be the same, as for example in the cases of tests 13 and 13a. Thus to compute the effect of my process on the pigment employed in this and any subsequent table where a thinning agent is employed, the adhesive requirement of the original material is taken as that shown by an adhesive requirement test made on the pigment after treating it initially with the small percent by weight of casein and allowing it to stand for at least several hours.

Although the percentage reduction in adhesive requirement obtained in the second series of tests in Table III is about the same order of magnitude as that obtained in the corresponding or approximately corresponding tests shown in Table II (both run at a peripheral speed of the disc of 45 ft. per second), actually twice as much material was treated in a given time in the second series of tests in Table III.

Some results, of course, can be obtained by the use of a peripheral speed of the disc lower than the 33 feet per second shown in Table III, particularly where there is employed a pigment slurry of very high concentration obtained by the use of a thinning agent, but the results drop off sharply as the peripheral speed is decreased, and soon there is reached a speed range in which either no effect at all is obtained or in which the effect is so small as to be of substantially no importance commercially. Thus while a peripheral speed of around 30′ per second is not the lowest at which some effect can be obtained, it is approximately as low as it would be worth while to run in commercial practice.

The tests shown in Tables II and III are sufficient to illustrate this particular modification of the first adaptation of my method. Although this modification is an improvement of the original arrangement of the first adaptation of my method shown in Table I, nevertheless this modification involves a large number of passes, and is also relatively inefficient from the standpoint of power consumption. A large number of other mechanical arrangements might be employed in the practice of this first adaptation of my process. But such devices all suffer from the defect that the results are obtained at the expense of high energy consumption, and of a large number of passes (or long retention if operated on a batch basis), and usually the effects obtained are not so intense as it is possible to obtain by the second and third adaptations of my process.

The second adaptation of my process is the striking, by the striking surfaces of a rotating element, of a jet or jets of slurry, the jet or jets being directed against the striking surfaces, preferably substantially in a plane of rotation of the element and as nearly tangential to the rotating element and as nearly at right angles to the leading faces of its striking surfaces at the point of impact as may be feasible, and in a direction opposed to that of the rotation of the element. The jet or jets may have any desired speed, the operation with a jet or jets of considerable velocity being disclosed but not claimed in my Patent No. 2,383,509. A number of devices may be employed in the practice of this second adaptation of my process, for example, the same type of rotating elements and striking surfaces that I have described in detail previously herein, but I prefer a circular saw. A circular saw with the leading faces of the teeth radial in respect to the saw and at right angles to the planes of rotation of the saw is especially suitable, and the jet or jets of slurry are conveniently arranged in any of the planes of rotation of the saw to strike as near tangentially as possible in respect to the periphery of the saw.

The invention will be better understood from the accompanying drawing and the detailed description of the figures therein. In the drawing, similar numerals indicate like parts. The drawing is intended to be illustrative only and not limiting. In this showing:

Figure 1 is a front elevational view, in fragmentary form, of a circular saw, with nozzle and jet, illustrating an apparatus suitable for practicing the preferred embodiment of the second adaptation of my process referred to directly above;

Figure 2 is a front elevational view, in fragmentary form, of a circular saw, with nozzle and jet, illustrating an apparatus suitable for practicing the preferred embodiment of the third adaptation of my process, to be referred to in detail later herein; and In Figure 1, circular saw 10 (shown in fragmentary form), rotating in the direction of the applied arrow, is provided with tooth 11, one of a series on the periphery of circular saw 10, which strikes jet 12, issuing from nozzle 13 (shown in fragmentary form) in the direction of the adjacent arrow. Nozzle 13 may be one of a series similarly located beyond the periphery of circular saw 10.

In order to exemplify this second adaptation of my process, I cite in Table IV a series of tests made in accordance therewith. The pigment employed was the same as that in the tests in Table I, at the same concentration. The same saw and driving apparatus was also used. The saw casing was also the same as previously employed, but in the present instance it was used merely as a collecting shield to surround the saw, and to conduct away from the saw the slurry which had already been delivered into the path of the saw by a jet, and been hit by the saw teeth. This conducting away of the slurry was accomplished by means of the valved opening at the apex of the V at the bottom of the saw casing which was considerably below the saw and drew off the slurry without its having further contact with the saw. The slurry was introduced into the path of the saw by pumping through a nozzle having a channel diameter of .0887″ and a channel length of .94″, the jet from the nozzle being approximately 1 1/16″ long from the end of the nozzle to the point where it first came in contact with the advancing tooth over the point of the preceding tooth, and the angle of the jet with the radial advancing face of the tooth at the point it first made contact therewith, was approximately 60°. For the tests involving more than one pass, the volume of slurry employed was passed through the apparatus the requisite number of times.

*Table IV*

| Test No. | No. of passes | Speed of issuing jet, ft. per sec. | Peripheral speed of saw, ft. per sec. | Adhesive requirement, per cent | Per cent reduction in adhesive requirement, based on orig. as 100% |
|---|---|---|---|---|---|
| 1 | | | | 26 | |
| 23 | 1 | 62 | 460 | 24 | 8 |
| 24 | 10 | 62 | 460 | 21 | 19 |
| 25 | 20 | 62 | 460 | 19 | 27 |

It will be seen from examination of Table IV that the results obtained compare very favorably with those shown for the corresponding number of passes in Table II, notwithstanding the fact that the power required to treat the same quantity of pigment was estimated to be somewhat less in Table IV than in Table II. It was moreover found that the group of tests shown in Table IV was not as efficient as could be obtained since the thickness of the saw used was not sufficient definitely to insure complete striking contact with the entire cross sectional area of the jet because of the slight spreading of the jet after it left the nozzle orifice. Furthermore, because of the relatively low speed of the issuing jet, the windage of the saw had a relatively great effect in deflecting and spreading the jet.

However, the efficiency of this second adaptation of my process is fairly good from the standpoint of power consumption, because the striking force of the saw is directed against a limited volume of the slurry which is confined in the form of a jet. But it is not quite so good as desired, because it is not possible to arrange the nozzle to deliver a jet exactly tangentially in order that the advancing tooth may strike it exactly at a right angle to the leading face of the tooth because of the interference with the jet by the teeth preceding the one which would otherwise hit the jet at a right angle. If it is attempted to overcome this by making the teeth slope back at a slight angle from the radial, and so adjusting the position of the nozzle that the jet travels in a direction at a slight angle beyond the tangential so that the leading face of the first tooth does hit the jet substantially at a right angle, then although the teeth hit the jet at right angles, they do not hit a jet which is in a tangential position in respect to the saw, which is the jet which they would hit with the most effective force. Furthermore the jet cannot be arranged conveniently from a mechanical standpoint to hit the tooth of the saw at a distance very close to the nozzle orifice. These difficulties can be overcome to some extent by using wider spaced teeth but this tends to decrease the efficiency. For all these reasons the second adaptation of my invention, although more satisfactory for use than the first adaptation, is not the most desirable and efficient, and I therefore prefer to employ the third adaptation of my invention which I shall now describe in detail, particularly the preferred embodiment thereof.

In the third adaptation of my invention, the striking surfaces of the moving element may strike against a jet or jets of slurry directed in a plane or planes passing substantially through the axis of rotation of the rotating element. The jet or jets are thus hit on their cylindrical surface (i. e. in the case of a jet issuing from a circular orifice) rather than on their cross sectional area as in the second adaptation of my invention. These jets may have any direction in the planes indicated, for example, they may be directed at right angles to the planes of rotation of the element but for reasons which will be later outlined, I prefer jets which are directed in a direction substantially radial to and in a plane of rotation of the element. Here, as in the case of the first and second adaptations of my process, a number of devices may be employed for the rotating elements and striking surfaces thereof, for example, the same type of rotating elements and striking surfaces which I have described in detail previously herein. I prefer a circular saw and a saw with the leading faces of the teeth radial and in planes at right angles to the planes of rotation of the saw is especially suitable. Thus in the preferred embodiment of the third adaptation of my invention, which is the embodiment I prefer to employ in practicing my invention, I employ such a circular saw and a nozzle or nozzles located beyond the periphery of the saw which delivers a jet or jets of slurry in a plane of rotation of the saw, directed toward the saw radially in respect to the saw, so that the leading faces of the teeth are disposed substantially parallel to the jet or jets at the point of impact.

Figure 2 illustrates an apparatus suitable for practicing the preferred embodiment of the third adaptation of my invention described directly above. In Figure 2, circular saw 10 (shown in fragmentary form), rotating in the direction of the applied arrow, is provided with tooth 11, one of a series on the periphery of circular saw 10, which strikes the end portion of jet 12, issuing from nozzle 13 (shown in fragmentary form) in the direction of the adjacent arrow. Nozzle 13 may be one of a series similarly located beyond the periphery of circular saw 10.

In order to exemplify the third adaptation of my process, I cite in Table V a series of tests made in accordance therewith. The pigment employed was the same as that used in the tests shown in Table IV, at the same concentration; and the same saw, driving apparatus, and saw casing were employed. The only difference in the arrangement of the apparatus was in the employment of a different nozzle, through which the slurry was introduced by pumping, and in the placement of the nozzle, the nozzle in the present instance being arranged in a plane of rotation of the saw pointing toward the saw in a radial position in respect to the saw, the end of the nozzle being approximately 3/32" from the periphery of the saw, the longitudinal axis of the jet, of course, being centered as closely as possible at the center point across the thickness of the saw. The nozzle employed in tests Nos. 26–28 had a channel diameter of .0697", and a channel length of .30"; that employed in test No. 29, a channel diameter of .051", and a channel length of .94", and that employed in Test No. 30, a channel diameter of .0277", and a channel length of .25".

*Table V*

| Test No. | No. of passes | Speed of issuing jet, ft. per sec. | Peripheral speed of saw, ft. per sec. | Adhesive requirement, per cent | Per cent reduction in adhesive requirement, based on orig. as 100% |
|---|---|---|---|---|---|
| 1 | | | | 26 | |
| 26 | 20 | 100 | 460 | 12 | 54 |
| 27 | 53 | 100 | 460 | 10 | 62 |
| 28 | 103 | 100 | 460 | 9 | 65 |
| 29 | 52 | 186 | 460 | 9 | 65 |
| 30 | 20 | 556 | 460 | 10 | 62 |

The excellent results, shown in Table V, obtained by the third adaptation of my process, namely, a reduction from approximately one half to two thirds in the adhesive requirement, are of a greater degree of intensity than it appears to be readily feasible to obtain with either the first or second adaptation of my process, and this coupled, among other things, with its relatively lower power consumption, makes the third adaptation, as stated above, my preferred adaptation.

A comparison of the results obtained in Table V in respect to the effect of the speed of the issuing jet thereon shows that a higher speed of issuing jet appears to give a little better result in a lesser number of passes, but does not affect materially the ultimate intensity of the effect obtained. This somewhat better result may possibly be attributable to some extent at least to the effect of the passage of the slurry of pigment comprising artificially prepared calcium carbonate through the nozzle, as disclosed in my Patent No. 2,383,509, particularly in the case of a high speed jet such as that of test No. 30, and to a lesser extent in the case of a lesser speed jet such as in the case of test 29. However I have found by careful experiment that where a nozzle is used to give a jet of a relatively lower speed, such as in Tests 26 to 28, for use in conjunction with a saw, that the effect produced by passage of the slurry of pigment comprising artificially prepared calcium carbonate through the nozzle and the effect produced by the saw are not additive but rather parallel, and that the nozzle effect has no influence on the effect produced by the saw providing the intensity of the saw effect is the same as or greater than that of the nozzle effect. All the results herein reported, in which a nozzle is employed, with the possible exception of tests 29 and 30 as indicated above, are the effect of the saw alone and do not represent a combined effect of the saw and nozzle.

In the particular saw employed, the distance from point to point of the teeth was .5". In tests 26 to 28, the speed of the issuing jet was 100 ft. per sec. and that of the periphery of the saw was 460 ft. per sec., and thus the jet travelled 21.7% as fast as the saw, travelling radially about .11" while the saw was travelling peripherally .5". Thus the length of the cylindrical jet cut off by each saw tooth was about .11" long. Actually the section cut off is not a vertical cylinder with top and bottom at right angles to the longitudinal axis, but rather one with slightly curved top and bottom surfaces owing to the fact that the jet is constantly advancing while the saw tooth is cutting across it. By a calculation similar to the above, it is found that in test 29 the jet advances approximately .2" between teeth, while in test 30, it advances approximately .6". Inasmuch as the depth of the gullet between the teeth is only .375" (3/8"), and the backs of the teeth slope down at an angle of approximately 45°, it is apparent that in test 30 the jet hits at least part of the sloping back of the tooth between each two teeth, (which makes a relatively ineffective target because of the angle), as well as probably the bottom of the gullet between each two teeth, one third the total length of the jet between each two successive teeth hitting these surfaces as targets and only about two-thirds of its length (limited to the depth of the gullet) being struck a blow by the oncoming tooth at right angles to the longitudinal axis of the jet. Thus it is apparent that when practicing the third adaptation of my invention, the optimum effect to be obtained by the striking of the radial tooth faces against the jet is secured when the speed of the issuing jet is less than that which would bring the jet into contact with the back of the teeth or the bottom of the gullets. Within this limitation, the speed of the jet should preferably be great enough substantially to overcome the dispersing effect on the jet caused by the windage of the saw.

Apart from the influence of jet speed in overcoming the effect of windage, the windage effect may be lessened by shortening the distance between the end of the nozzle and the tip of the teeth of the saw, and I have found that in practice this distance can be reduced safely to about 1/8" without probability of accident due to the hitting of a slightly misplaced nozzle by the saw teeth. I prefer to operate with such a short distance, or even a shorter one when it is mechanically feasible, because of the lesser effect of windage. At a nozzle distance of 1/8", I have found that a jet speed of approximately 75' to 100' per second (representing a pressure somewhere in the vicinity of approximately 75 to 150 lbs. per square inch dependent of course upon the channel length of the nozzle), is a satisfactory range in which to operate, although of course lower or higher velocities may be employed.

As is apparent, at any given jet speed, the smaller the channel diameter of the nozzle, the smaller will be the diameter of the jet and thus the greater will be the effect caused by the impact of the tooth, because the same force is expended on a smaller cross sectional area of slurry. From this point of view, nozzles of smaller channel diameter are desirable, but in practice the channel diameter is controlled in general by the number of nozzles which can be arranged around the saw periphery, the jet speed, the volume required to be delivered to the saw, and the thickness of the saw. It is also apparent that a jet issuing from a nozzle having a channel of oval or flattened cross section, the jet being exposed to the saw with the broader side contacting the leading face of the tooth, will give a more effective result because of the thinner layer of slurry which the tooth strikes, but this requires a nozzle which is more difficult and expensive to manufacture, and although such a nozzle can be used, I have found nozzles with channels of circular cross section entirely suitable for my purpose, and that is the type used in the tests cited herein.

When the path of the jet with respect to the saw is considered, it is clear why I do not prefer, at least when using a saw with teeth cut in the ordinary manner, to use radial jets directed at right angles to the planes of rotation of the saw, rather than in a plane of rotation of the saw. Such a jet arranged at right angles to the planes of rotation of the saw close to the periphery of the saw would hit the side of each tooth as it passed in front of the jet, and would only enter the space between one tooth and the next after it had hit the side of that tooth. The result would be that the flat side of the tooth would become a target for approximately half of the time, and thus only about half of the volume of slurry passing through the nozzle would be struck by the radial face of the tooth. This, therefore, would result in considerable inefficiency, which could be avoided if the saw teeth were shaped so that they sloped back from the radial face from one side at an angle. This could be done, but it represents an unusual shape and a special type of grinding job to form the teeth originally and in any subsequent grinding, and besides offers no mechanical advantage of any importance. Thus it is apparent that the radial type of jet arranged in a plane of rotation of the saw is superior from the standpoint of convenience, and, except when using a saw with special shaped teeth, is superior in efficiency. This, therefore, is the type of jet I prefer to use. There is a slight modification of the radial jet which may be used if desired, and that is a jet which has a direction at a slight angle to the radial toward the oncoming teeth. The object of this is so that the jet may be swerved back toward a radial position by the windage of the saw. If the jet is radial to start with it may be swerved slightly from the radial by the windage, but if it is slightly less than radial to start with it may be swerved by the windage substantially into a radial position at the point where it is hit by the teeth, and thus the efficiency of the operation will be improved.

As another example of the practice of the third adaptation of my process, I cite in Table VI a further series of tests made in accordance therewith. Tests Nos. 31–33 were run with a slurry containing pigment and water, and tests Nos. 35–37 were run with a slurry containing pigment, water and casein as a thinning agent. The pigment employed for tests Nos. 31–33, namely, test No. 1, was the same as that used in the tests shown in Table V, and that used for test No. 35 and tests Nos. 36 and 37, namely, tests Nos. 34a and 34b respectively, was a pigment of the same composition but of a different commercial lot. Test No. 34a pigment was tested after it had stood some time with 1% casein, and was the original from which the per cent adhesive reduction of test No. 35 was computed. Test No. 34b pigment was tested after it had stood for some time with 2% of casein, and was the original from which the per cent adhesive reductions of tests No. 36 and 37 were computed. The same saw driving apparatus and saw casing were employed as were used for the tests shown in Table V; but the saw used, although of the same diameter and teeth arrangement, was $\tfrac{5}{16}$″ instead of $\tfrac{1}{8}$″ thick. The nozzle employed had a channel diameter of .0697″ and a length of .3″. In tests Nos. 31–33, the end of the nozzle was approximately $\tfrac{1}{4}$″ from the periphery of the saw, and in tests Nos. 35–37 it was $\tfrac{5}{32}$″. The nozzle was arranged in the same position as the nozzle used in the tests shown in Table V.

*Table VI*

| Test No. | No. of passes | Speed of issuing jet, ft. per sec. | Peripheral speed of saw, ft. per sec. | Conc. of slurry, g. p. l. pigment present | Per cent casein present on wt. of pigment | Adhesive requirement, per cent | Per cent reduction in adhesive requirement based on orig. as 100% |
|---|---|---|---|---|---|---|---|
| 1 | | | | | | 26 | |
| 31 | 5 | 90 | 473 | 392 | | 13.5 | 48 |
| 32 | 10 | 90 | 473 | 392 | | 12 | 54 |
| 33 | 14 | 90 | 473 | 392 | | 12 | 54 |
| 34a | | | | | 1 | 20 | |
| 35 | 5 | 93 | 471 | 731 | 1 | 12 | 40 |
| 34b | | | | | 2 | 22 | |
| 36 | 5 | 88 | 468 | 570 | 2 | 11 | 50 |
| 37 | 10 | 88 | 468 | 570 | 2 | 10.5 | 52 |

The excellent results obtained with a relatively small number of passes in the above series of tests are apparent from the high per cent reductions in adhesive requirement listed in the last column in Table VI.

As a still further example of the practice of the third adaptation of my process, I cite in Table VII another series of tests made in accordance therewith. Tests Nos. 39–43 were made with a slurry of pigment and water, and tests Nos. 45–48 were made with a slurry of pigment, water and casein as a thinning agent. The pigment employed was the same as that employed for the tests shown in Table VI but of different commercial lots, that employed as original for tests Nos. 45–48, namely, test No. 44, being tested for adhesive requirement after it had stood some time with 2% casein. The saw employed for these tests was 36″ in diameter, $\tfrac{1}{4}$″ thick, with the same tooth arrangement as the previous saws, namely, ½" point to point, ⅜" to bottom of gullet between teeth, the advancing face of each tooth being radial, and the rear of each tooth sloping back at an angle of approximately 45°. 60 nozzles were arranged radially with respect to the saw, equidistantly around the periphery of the saw, the ends of the nozzles being ⅛" from the periphery of the saw, but every fourth nozzle was plugged off for these tests, leaving 45 in use, as the slurry pump employed was only of sufficient capacity to feed 45 nozzles at the pressure desired. The nozzles were of steel, the channel in each being .0697" in diameter and ¾" long. The jets from the nozzles were directed toward the saw, in radial planes of the saw, in a plane of rotation of the saw, midway across the thickness of the saw. A steel casing around the saw conducted the slurry away after it had been struck by the saw. The shaft, on one end of which the saw was mounted, was driven by a 75 H. P. 3600 R. P. M. motor, (about 3520 R. P. M. under load), directly coupled to the shaft at the end opposite to that at which the saw was affixed.

ficially prepared calcium carbonate is the sole constituent, or it may be a pigment in which an additional constituent or constituents is present, such for example as magnesium hydroxide in the case of calcium carbonate magnesium hydroxide, and the like. The illustrative tests so far cited were made on various samples of calcium carbonate magnesium hydroxide. For purposes of further illustration, I now cite tests performed on pigments comprising artificially prepared calcium carbonate in which artificially prepared calcium carbonate is the sole constituent, said calcium carbonate being made by several commonly used commercial methods, e. g. by the causticization of sodium carbonate with lime, and by the carbonation of lime with carbon dioxide.

Table VIII shows a series of tests conducted on artificially prepared calcium carbonate made by the causticizing process (high calcium lime and sodium carbonate). This was a very fine particle size pigment of excellent quality. It was treated in the same apparatus as that employed for running the tests shown in Table VI, the end of the nozzle in the present instance being .17" from the periphery of the saw. Test No. 49 is

*Table VII*

| Test No. | No. of passes | Speed of issuing jet, ft. per sec. | Peripheral speed of saw, ft. per sec. | Conc. of slurry, g. p. l. pigment present | Per cent casein present on wt. of pigment | Adhesive requirement, per cent | Per cent reduction in adhesive requirement based on orig. as 100% |
|---|---|---|---|---|---|---|---|
| 38 |  |  |  |  |  | 21 |  |
| 39 | 4 | 64 | 553 | 250 |  | 17 | 19 |
| 40 | 8 | 64 | 553 | 250 |  | 15 | 29 |
| 41 | 12 | 64 | 553 | 250 |  | 14.5 | 31 |
| 42 | 16 | 64 | 553 | 250 |  | 14 | 33 |
| 43 | 20 | 64 | 553 | 250 |  | 13 | 38 |
| 44 |  |  |  |  | 2 | 21 |  |
| 45 | 5 | 64 | 553 | 630 | 2 | 15 | 29 |
| 46 | 10 | 64 | 553 | 630 | 2 | 13.5 | 36 |
| 47 | 15 | 64 | 553 | 630 | 2 | 12.5 | 40 |
| 48 | 20 | 64 | 553 | 630 | 2 | 11.5 | 45 |

Here again excellent results were obtained, those with the casein-containing slurry at a high concentration (tests Nos. 45–48) being the better. For the purpose of avoiding difficulty with foam, an anti-foam agent, in this case pine oil ("evener"), was incorporated in the slurry in tests Nos. 45–48 in a small amount, in this instance employing approximately .1% based on the dry weight of pigment present.

I have previously stated herein that my process is applicable to pigments comprising artificially prepared calcium carbonate by whatever method of manufacture produced. Such a pigment, as stated, may of course be a pigment in which artithe original artificially prepared calcium carbonate employed in tests 50 and 51, and test No. 49a is the same pigment as test No. 49, except that 2% casein has been added to it, which, as will be noted, has decreased its adhesive requirement from 19% to 16%. Test 49a is the original of tests Nos. 52—57. In the first series, the sample of calcium carbonate was run for 1 and 20 passes at approximately as high a concentration as could be pumped with the pump employed, namely, 226 g. p. l. By the employment of a small amount of thinning agent, casein, as shown in the second series of tests, it became feasible to use a concentration approximately three times as great as in the first series.

*Table VIII*

| Test No. | No. of passes | Speed of issuing jet, ft. per sec. | Peripheral speed of saw, ft. per sec. | Conc. of slurry, g. p. l. pigment present | Per cent casein present on wt. of pigment | Adhesive requirement, per cent | Per cent reduction in adhesive requirement based on orig. as 100% |
|---|---|---|---|---|---|---|---|
| 49 |  |  |  |  |  | 19 |  |
| 50 | 1 | 84 | 471 | 226 |  | 17 | 11 |
| 51 | 20 | 84 | 471 | 226 |  | 15 | 21 |
| 49a |  |  |  |  |  | 16.0 |  |
| 52 | 1 | 64 | 473 | 645 | 2 | 10.5 | 34 |
| 53 | 5 | 64 | 473 | 645 | 2 | 9.5 | 41 |
| 54 | 10 | 64 | 473 | 645 | 2 | 9 | 44 |
| 55 | 15 | 64 | 473 | 645 | 2 | 8.75 | 45 |
| 56 | 20 | 64 | 473 | 645 | 2 | 8.5 | 47 |
| 57 | 40 | 64 | 473 | 645 | 2 | 8.5 | 47 |

In the first series in Table VIII, proportionately as much effect was obtained by the first pass as by the subsequent 19 passes, a 21% reduction in adhesive requirement being shown in 20 passes. In the second series, similarly, the larger part of the reduction in adhesive requirement is shown by one pass, but a vast improvement in the efficiency of the process is evident, there having been obtained a greater percentage reduction in adhesive requirement with one pass in the presence of the thinning agent than with 20 passes without the thinning agent.

A study of the second series indicates that while the greater part of the reduction of adhesive requirement was obtained in one pass, with only slight further reduction in subsequent passes, that this was not the case with the change in the other properties obtained by subjection of the pigment to my process. For example, the shine i. e. gloss imparted to the paper increased approximately proportionately up to about 20 passes, and then seemed to remain approximately constant, indicating a slower development in this property than in that of the reduction of adhesive requirement. Furthermore it was noted that the papers improved in brightness up to about the 15th pass, after which there appeared to be a slight diminution, the 20th pass being approximately the same as the original, whereas the 40th pass showed a distinct diminution in brightness. It is thus apparent that, at least for coating paper, where, although the reduction in adhesive requirement is of great importance, nevertheless improved finish and brightness are also sought after, it is desirable in any given case to determine by trial what number of passes should be given in order to obtain as nearly as feasible the qualities wanted in the pigment in their desired degrees. For some other uses, for example, when the pigment is to be used as a compounding ingredient in rubber, still other properties, important in rubber, may be developed in the pigment by further passes beyond the number of passes which it would be given for use in coated paper manufacture.

All tests so far reported herein have been conducted on material which is prepared in wet form and subjected to my process in wet form, prior to use or prior to drying. My process is also applicable to pigment comprising artificially prepared calcium carbonate which has been prepared in wet form and then dried. Artificially prepared calcium carbonate dried before use ordinarily gives somewhat poorer results both in coated and filled paper, for example, in a coated paper it may give a lower degree of finish than would otherwise be obtained, and may also result in the calcium carbonate requiring less adhesive, but this lowering of the adhesive requirement by drying is of relatively small value because of the accompanying depreciation in the other characteristics imparted to the paper by the calcium carbonate. Such calcium carbonate is amenable to treatment by my process, whereby the dry pigment, which may be already of somewhat lower adhesive requirement than the original pigment as it was prepared in wet form, is still further reduced in adhesive requirement by subjection to my process after mixing with water to give a slurry, with an accompanying improvement in other qualities of the material so processed, that is to say, in its finishing properties and the like. For purposes of illustration, an example of previously dried artificially prepared calcium carbonate treated by my process is shown in Table IX. The artificially prepared calcium carbonate for this series of tests was made by the carbonation process, i. e., by precipitating slaked lime slurry with carbon dioxide. It was then concentrated by filtration, dried and pulverized. The material was of a good grade, but the particle size was considerably less fine than that of the calcium carbonate used in the tests cited in Table VIII. Test 58 is the original artificially prepared calcium carbonate employed, tests 59–64 having been run on a slurry of this calcium carbonate and water. Test 58a is the same pigment as test No. 58, except that 2% of casein has been added to a paste containing the pigment and water, which, as will be noted, has not changed its adhesive requirement. Test 58a is the original of tests Nos. 65–70, those tests having been thus run on a slurry of this calcium carbonate, water and casein added as thinning agent. The equipment used for running the tests shown in Table IX was the same as that employed for running the tests of Table VIII.

*Table IX*

| Test No. | No. of passes | Speed of issuing jet, ft. per sec. | Peripheral speed of saw, ft. per sec. | Conc. of slurry, g. p. l. pigment present | Per cent casein present on wt. of pigment | Adhesive requirement, per cent | Per cent reduction in adhesive requirement based on orig. as 100% |
|---|---|---|---|---|---|---|---|
| 58 | | | | | | 17 | |
| 59 | 1 | 83 | 473 | 394 | | 13.5 | 21 |
| 60 | 5 | 83 | 473 | 394 | | 11 | 35 |
| 61 | 10 | 83 | 473 | 394 | | 9.5 | 44 |
| 62 | 15 | 83 | 473 | 394 | | 9.5 | 44 |
| 63 | 20 | 83 | 473 | 394 | | 9 | 47 |
| 64 | 25 | 83 | 473 | 394 | | 8 | 53 |
| 58a | | | | | 2 | 17 | 0 |
| 65 | 1 | 85 | 471 | 723 | 2 | 15.5 | 9 |
| 66 | 5 | 85 | 471 | 723 | 2 | 11 | 35 |
| 67 | 10 | 85 | 471 | 723 | 2 | 9 | 47 |
| 68 | 15 | 85 | 471 | 723 | 2 | 8 | 53 |
| 69 | 20 | 85 | 471 | 723 | 2 | 8 | 53 |
| 70 | 25 | 85 | 471 | 723 | 2 | 7 | 59 |

For purposes of further illustration I show in Table X the results obtained by operating the moving element at speeds including those intermediate to those already illustrated, and the effects obtained thereby. The artificially prepared calcium carbonate used in this series of tests was the same as that employed in the second series of tests shown in Table VIII, namely, test No. 49a (i. e. the pigment of test No. 49 with 2% of casein added thereto as thinning agent), the slurry used thus containing the artificially prepared calcium carbonate, water and 2% casein on the weight of the calcium carbonate as thinning agent. The same apparatus was used in making the tests as for the tests in Table VIII, excepting that the pulley on the motor driving the saw shaft was changed as required to give the desired peripheral speeds of the saw in the several tests, and in the tests run with the saw at peripheral speeds of 78 and 35 ft. per sec. the nozzle used in the other tests (which was the same as that used in the tests of Table VIII) was replaced by a nozzle having a channel diameter of .141" and a channel length of .27", the end of this nozzle being located substantially the same distance from the periphery of the saw as the nozzle it replaced. Tests No. 52, 53 and 56, taken from Table VIII, are included in Table X for purposes of comparison as they fall directly into the present series.

*Table X*

| Test No. | No. of passes | Speed of issuing jet, ft. per sec. | Peripheral speed of saw, ft. per sec. | Conc. of slurry, g. p. l. pigment present | Adhesive requirement, per cent | Percent reduction in adhesive requirement, based on orig. as 100 % |
|---|---|---|---|---|---|---|
| 49a | | | | | 16 | |
| 52 | 1 | 64 | 473 | 645 | 10.5 | 34 |
| 53 | 5 | 64 | 473 | 645 | 9.5 | 41 |
| 56 | 20 | 64 | 473 | 645 | 8.5 | 47 |
| 71 | 1 | 78 | 427 | 630 | 13 | 19 |
| 72 | 5 | 78 | 427 | 630 | 13 | 19 |
| 73 | 20 | 78 | 427 | 630 | 11 | 31 |
| 74 | 1 | 80 | 287 | 613 | 13.5 | 16 |
| 75 | 5 | 80 | 287 | 613 | 13.5 | 16 |
| 76 | 20 | 80 | 287 | 613 | 11 | 31 |
| 77 | 1 | 76 | 126 | 638 | 16 | 0 |
| 78 | 5 | 76 | 126 | 638 | 13.5 | 16 |
| 79 | 20 | 76 | 126 | 638 | 11.75 | 27 |
| 80 | 1 | 23 | 78 | 632 | 13.5 | [1] 16 |
| 81 | 5 | 23 | 78 | 632 | 14.5 | 9 |
| 82 | 20 | 23 | 78 | 632 | 13.5 | 16 |
| 83 | 1 | 23 | 35 | 640 | | (2) |
| 84 | 5 | 23 | 35 | 640 | 16 | 0 |
| 85 | 20 | 23 | 35 | 640 | 15.5 | 3 |

[1] This result appears to be out of line, probably too high. By the time the discrepancy had been noted, however, the sample was no longer available for making a check test.
[2] This was not determined, but in view of the result of test 84, made at the same peripheral speed of the saw but at 5 passes instead of at one pass, it is believed that this result is also zero.

The above table indicates that when employing a saw, some effect is obtained with a peripheral speed even as low as 35' per second, and doubtless at a somewhat lower speed. However, it is apparent that even at 78' per second the effect is only relatively small, but that the effect increases as the peripheral speed increases. It is therefore evident why, from a practical standpoint, it is desirable to use as high a peripheral speed as feasible, ordinarily speeds above 300' per second, and preferably around 500' per second, being desired.

Table X has been rearranged as Table XI, including, for the sake of simplicity, only the most necessary data of Table X.

*Table XI*

| Test No. | No. of passes | Peripheral speed of saw, ft. per sec. | Percent reduction in adhesive requirement, based on orig. as 100% |
|---|---|---|---|
| 49a | | | |
| 83 | 1 | 35 | (2) |
| 80 | 1 | 78 | [1] 16 |
| 77 | 1 | 126 | 0 |
| 74 | 1 | 287 | 16 |
| 71 | 1 | 427 | 19 |
| 52 | 1 | 473 | 34 |

*Table XI—Continued*

| Test No. | No. of passes | Peripheral speed of saw, ft. per sec. | Percent reduction in adhesive requirement, based on orig. as 100% |
|---|---|---|---|
| 84 | 5 | 35 | 0 |
| 81 | 5 | 78 | 9 |
| 78 | 5 | 126 | 16 |
| 75 | 5 | 287 | 16 |
| 72 | 5 | 427 | 19 |
| 53 | 5 | 473 | 41 |
| 85 | 20 | 35 | 3 |
| 82 | 20 | 78 | 16 |
| 79 | 20 | 126 | 27 |
| 76 | 20 | 287 | 31 |
| 73 | 20 | 427 | 31 |
| 56 | 20 | 473 | 47 |

[1] Same as corresponding note under Table X.
[2] Same as corresponding note under Table X.

The data in Table XI show clearly the general effect of increasing the peripheral speed of the saw.

I now cite data illustrative of the results obtained by subjecting naturally occurring calcium carbonate to my process. Two original samples were employed, tests No. 86 and 88, both of which were good commercial grades of finely ground limestone, the former, however, being finer than the latter. The samples were both received in dry form, and each was mixed with water to give a thick slurry for the tests. The equipment used for running the tests shown in Table XII was the same as that employed for running the tests of Table IX.

*Table XII*

| Test No. | No. of passes | Speed of issuing jet, ft. per sec. | Peripheral speed of saw, ft. per sec. | Conc. of slurry, g. p. l. pigment present | Adhesive requirement, percent | Percent reduction in adhesive requirement, based on orig. as 100 % |
|---|---|---|---|---|---|---|
| 86 | | | | | 8 | |
| 87 | 20 | 87 | 463 | 578 | 7 | 13 |
| 88 | | | | | 8 | |
| 89 | 20 | 89 | 464 | 670 | 6 | 25 |

From Table XII, it is noted that naturally occurring calcium carbonate is reduced in adhesive requirement by subjection to my process, but that generally speaking the reduction appears to be of a lesser degree of magnitude than is obtained with pigment comprising artificially prepared calcium carbonate. An outstanding effect of the treatment noted in tests 87 and 89, apart from the reduction in adhesive requirement, was a great improvement in spreading qualities. The original samples, tests 86 and 88, when mixed with adhesive and coated on paper in the usual manner gave very streaky coatings, while the treated samples, tests 87 and 89, gave very well spread coatings with absence of streaks. In these particular instances, no marked difference in the bloss after calendering was noted between the paper coated with the treated samples (tests 87 and 89) and that coated with the untreated samples (tests 86 and 88), in contradistinction to that noted when pigment comprising artificially prepared calcium carbonate treated by my process is employed.

Tests 87 and 89 were coated on paper directly in the wet condition after treatment. Some of this same material was dried first, then wet up and coated, and it was found that in this case, the adhesive reduction obtained in test 87 (the finer sample) was apparently lost, the adhesive requirement of the material after drying testing 8%, which was the same as the original (test 86). In contradistinction to this, material of test 89 after being dried and then wet up and tested for adhesive requirement, gave an adhesive requirement of 6%, the same as test 89 before drying, in this case showing no loss in reduction in adhesive requirement. However, both dried samples retained the excellent spreading qualities shown by the wet materials, which was much superior to the dried original untreated samples, tests 86 and 88. It is thus evident that, at least in the case of naturally occurring calcium carbonates which show a tendency to return to their original per cent adhesive requirement if used after drying, it is preferable, if feasible, to employ such materials after treatment in the wet form without intermediate drying, although, of course, there can be intermediate drying if desired, because as shown, in some cases, the reduction in adhesive requirement is retained on drying, and in all cases the improved spreading qualities are retained.

Several samples of the pigments comprising artificially prepared calcium carbonate, tests on which have been reported previously herein, have been dried after treatment and then subjected to adhesive requirement test. In some cases it was found that there was some slight loss shown in the reduction in adhesive requirement over that shown when the sample was tested directly in wet condition, but this loss was of relatively small degree, and in no case did it come anywhere near returning the adhesive requirement to the value shown by the original material as in the case of the dried material of test 87.

As in the case of the treatment of pigment comprising artificially prepared calcium carbonate, I may treat naturally occurring calcium carbonate by my process either as it may occur in the operation of producing it as a wet slurry if it is produced by a wet process, or if it is in dry form, may add water to it to convert it into slurry form. It may then be used in wet form, or after concentrating to a paste, or after drying, as may be desired. Also instead of treating naturally occurring calcium carbonate, I may treat pigment comprising naturally occurring calcium carbonate, such as magnesian limestone or dolomite in finely divided form.

While I may employ any number of passes I desire, in general, in commercial operation, I prefer to use from 5 to 30 passes or thereabout, and usually employ about 10 to 20 passes.

For the purpose of illustrating the reduction in oil absorption by my process, I list in Table XIII a number of the samples referred to above on which adhesive requirement tests have already been recorded herein.

*Table XIII*

| Test No. | No. of passes | Speed of issuing jet, ft. per sec. | Peripheral speed of saw, ft. per sec. | Oil absorption | Percent reduction in oil absorption based on orig. as 100% |
|---|---|---|---|---|---|
| 1 | | | | 48.7 | |
| 28 | 103 | 100 | 460 | 29.4 | 40 |
| 29 | 52 | 186 | 460 | 27.7 | 43 |
| 30 | 20 | 556 | 460 | 29.1 | 40 |
| 31 | 5 | 90 | 473 | 35.8 | 27 |
| 32 | 10 | 90 | 473 | 34.9 | 28 |
| 33 | 14 | 90 | 473 | 34.1 | 30 |
| 58 | | | | 43.2 | |
| 59 | 1 | 83 | 473 | 41.1 | 5 |
| 60 | 5 | 83 | 473 | 34.2 | 21 |
| 63 | 20 | 83 | 473 | 27.5 | 36 |
| 86 | | | | 19.4 | |
| 87 | 20 | 87 | 463 | 18.4 | 5 |
| 88 | | | | 16.5 | |
| 89 | 20 | 89 | 464 | 14.3 | 13 |

In Table XIII, as will be apparent, tests Nos. 1, 58, 86, and 88 are the original samples from which the test or group of tests immediately following those respective tests was prepared. It will be noted that the per cent reduction in oil absorption is in general much greater in the case of pigments comprising artificially prepared calcium carbonate, tests Nos. 1 and 58, than it is in the case of the naturally occurring calcium carbonate, tests Nos. 86 and 88. This is similar to the situation in respect to per cent reduction in adhesive requirement previously referred to.

The moving element which I employ in the practice of my invention is subject to considerable wear in respect to its striking surfaces. When using my preferred moving element, i. e. a saw, I may, if desired, employ one having inserted teeth, particularly teeth made of or tipped with very hard material, or, if feasible, teeth cut directly in the saw itself may be so tipped.

While I have described the use of nozzles, any device structurally capable of producing with pressure a jet of any desired cross section may be employed, such for example, as an annular conduit surrounding a saw peripherally, said conduit having slits or holes on its inner surface for delivering a jet or jets of slurry into the path of the saw teeth.

The word "nozzle" is sometimes used as being restricted to one of circular cross section and of tapered longitudinal section. However, I do not use the word in such restricted sense, as the nozzle I may employ may be of any desired cross section and/or longitudinal section. The length of the channel of the nozzle may be in any relation to the area, diameter or other dimension of the nozzle orifice. Thus in my use of the word "nozzle," I mean it to be broadly interpreted as indicated above. However, I prefer a nozzle having a channel of circular cross section and of cylindrical shape, with the channel length at least several times the channel diameter, and usually from three to fifteen times the channel diameter.

I have described the operation of my process, when employing only one pass, by feeding a slurry to the inlet of a pressure imparting device, such as a pump, discharging it through a nozzle or nozzles into the path of a moving element and then passing the slurry out of the system. This of course applies either to a batch or continuous process. In the operation of my process where more than one pass is employed, I have described the use of a device such as a pump, in a batch process, to force a slurry through a nozzle or nozzles into the path of the moving element. After a given volume of slurry has been passed from the system once, the operation is repeated until a sufficient number of passes have been made.

Another method of making multiple passes may employ the same pump, nozzle or nozzles and moving element combination previously described, but in this instance the apparatus is so arranged that any desired proportion of the effluent from the moving element rather than its entire volume, can be allowed to flow from the system as finished product, the remainder of the effluent being delivered by gravity back into the inlet of the pump feeding the nozzle or nozzles. In conjunction with this apparatus, there is employed a proportioning pump of a maximum capacity somewhat less than that of the nozzle feeding pump. The proportioning pump can be regulated accurately to deliver any desired capacity below its maximum. The original slurry is fed into the inlet of the proportioning pump, the outlet of the proportioning pump delivering into the inlet of the nozzle feeding pump.

By delivering a measured volume per minute of the original slurry from the proportioning pump into the inlet of the nozzle feeding pump, allowing an equal volume per minute of the effluent from the moving element to flow from the system as finished product, and delivering the remainder of this effluent to the inlet of the nozzle feeding pump, a continuous process results. By properly regulating the rate of feed from the proportioning pump, and continuously drawing off a portion of the effluent from the moving element equal in volume to this rate of feed, a final product having made any desired number of passes can be obtained. The number of passes is equivalent to the quotient resulting from dividing the volume pumped per minute by the nozzle feeding pump by the volume per minute delivered to it by the proportioning pump (or what is the same volume, namely, that flowing from the system as finished product).

The method above described is adapted to a continuous process, and is my preferred procedure when operating my process as a continuous process.

Another way of conducting my process with multiple passes, which is very simple, and also effective, is to run the process as a batch instead of a continuous process and provide only one tank containing the slurry. This is my preferred procedure when operating my process as a batch process. The tank of appropriate size is preferably provided with an agitator, and the slurry contained therein may be drawn off as from a valve at the bottom of the tank into the nozzle feeding pump, pumped through the nozzle or nozzles into the path of the moving element and the effluent from the moving element delivered back into the same tank.

Inasmuch as a substantial proportion of the energy employed in the process is converted into heat, it is usually, although not necessarily always, desirable to make some provision for dissipating the heat evolved, both in the continuous and in the batch processes described. If a tank be employed, and this is very large in proportion to the volume pumped per minute, the natural convection currents may dissipate the heat sufficiently but generally it is desirable to provide some cooling device, such as a cooler or water jacket.

As stated previously herein, the efficiency of my process increases with increasing concentration of the slurry employed. In those cases where the slurry is processed while in a stage of an operation in which the concentration is fixed by other considerations, it naturally is processed at the concentration so fixed. For slurries thicker than a reciprocating pump will ordinarily handle, there are other well known pumps available. Such pumps as these will handle very heavy slurries. However there is a limit to the thickness of slurry which may be pumped even by such pumps, or which may be used in forms of apparatus employed in practicing my invention which may function without a pump, e. g. where the feed is by a static head of liquid, which thus would apparently impose an upper limit of concentration of slurry which I may use in my process.

I have, however, as previously referred to briefly herein, devised a very satisfactory way of overcoming this limitation. This method consists in making up the slurry of the pigment comprising calcium carbonate and water with the aid of a "thinning agent," i. e., an agent adapted to reduce the viscosity of the mix. I have found that there are a number of suitable thinning agents such, for example, as protein, proteinaceous material, protein-like material or protein derivatives, for instance casein; modified starches such as "Feculose ETO," "Feculose O," "Hercules Gum," "Satin Gum 35"; or pectin, dextrin, sodium silicate, and the like. Only a relatively small amount of the thinning agent is required, usually from ¼% to 5% on the calculated dry weight of the pigment comprising calcium carbonate, although more may be used if desired. Casein, conveniently dissolved in an alkaline solvent, may be added to a paste comprised of water and pigment comprising calcium carbonate, usually in an amount from about one-half to three percent of casein on the dry weight of pigment present, and this thins the paste down to a consistency at which it exhibits flow and may be pumped or otherwise used. Or the casein solution may be mixed with a dry pigment and water added.

Instead of adding the thinning agent in solution form to the paste of water and pigment comprising calcium carbonate, or to a pigment and water mixture, a substantially equivalent procedure may be followed by adding the thinning agent in undissolved form in the proper quantity, and dissolving it directly while incorporated with the paste, or pigment and water mixture, adding any solvents that may be necessary, using either no extra water or a limited quantity of extra water if desired. Or a dry thinning agent, already in soluble form, e. g. sodium caseinate may be used.

As an example of the outstanding effect of the use of a thinning agent, I can cite the following. A certain quality of calcium carbonate magnesium hydroxide with which it was not feasible to employ a concentration much if any higher than 300 g. p. l. of slurry when employing a certain pump; but by the expedient of employing about 1% of casein based on the weight of the dry calcium carbonate magnesium hydroxide in the slurry, it was possible to employ a concentration as high as 700 to 750 g. p. l. or thereabout with the same pump. An artificially prepared calcium carbonate was difficult to prepare with water in a slurry form which could be pumped, at a concentration much higher than approximately 226 g. p. l. When 2% of casein was used, however, a concentration of approximately 645 g. p. l. could be used. A sample of artificially prepared calcium carbonate in a dried form could be made up with water to a slurry having a concentration of 394 g. p. l. When 2% casein was used therewith, a concentration of 723 g. p. l. could be used. A naturally occurring calcium carbonate could be made up with water to a slurry having a concentration of about 578 g. p. l., and a coarser grade to a concentration of 670 g. p. l. By adding a small percentage of casein to a thick watery paste of each of these materials, very fluid slurries were obtained at concentrations of about 1152 g. p. l., and 1244 g. p. l., respectively, both with the employment of 1% casein.

It is apparent that this procedure of employing a thinning agent thus enables a very marked advance in efficiency to be obtained in the practice of my process, because it permits the employment of a more concentrated slurry therein. Where the pigment comprising calcium carbonate is to be used in coated paper or in cold water paints or the like, the casein employed as a thinning agent may serve as part of the adhesive which will subsequently be added prior to use.

With certain thinning agents, particularly casein, there appears to be some reaction between the small amount of casein used and pigment comprising artificially prepared calcium carbonate, which is manifest after an appreciable time, for example, several hours up to 24 hours, and which apparently reduces somewhat the adhesive requirement of the pigment. Whether or not this reaction takes place appears to be governed, among other things, by the amount of casein added, ¾% based on the dry weight of the pigment present apparently in some cases giving the maximum effect, whereas 2% sometimes apparently gives little or no effect. The length of time required to effect the result has not yet been accurately determined, nor has the optimum percentage of casein required in all cases, nor all the other conditions under which the phenomenon manifests itself, so that this situation has thus not been completely worked out in all these aspects. However, some other information has been collected on this subject. For example, the phenomenon does not appear to take place with pigment comprising artificially prepared calcium carbonate which has previously received a large reduction in casein requirement by treatment in my process, and, in certain cases at any rate, it does not appear to take place with pigment comprising artificially prepared calcium carbonate which has been dried before testing. Moreover it does not take place with pigment comprising calcium carbonate in which the calcium carbonate is naturally occurring.

It will be understood, of course, that as large a percentage of casein or other thinning agent as desired may be employed with the pigment to be treated by my process, and if the thinning agent is an adhesive, such as casein, this may be sufficient for employment with the pigment in the final use to which the pigment is to be put.

Likewise any slurry may be employed comprising pigment which comprises calcium carbonate, which may constitute an industrial mix or any part of that mix. I may, of course, if desired employ in my process a slurry comprising pigment which comprises calcium carbonate and water in combination with other liquid, or I may employ in my process a slurry comprising pigment which comprises calcium carbonate and liquid other than water, for example an oil or other organic liquid.

I may, if desired, carry out my process either at atmospheric, superatmospheric or subatmospheric pressure, that is, in respect to the pressure of the gas, such as air, surrounding the moving element. I prefer to operate at substantially atmospheric pressure in respect to the space surrounding the moving element; however, owing to the fan like action of the moving element, there is usually a slight induced pressure in the space surrounding its periphery, which raises the pressure near its periphery slightly above atmospheric.

The illustrative series of tests showing the percentage of adhesive requirements given herein were as stated performed with casein (derived from milk), the adhesive most commonly used in the manufacture of paper. However, similar percentage reduction in adhesive requirement of pigment comprising calcium carbonate processed by my method may be obtained with other adhesives employed in the paper coating industry such as starch, either unmodified, or more usually in some modified form, glue, gums, or protein, proteinaceous, protein-like or protein containing adhesive derived from other sources such as soya bean, corn (zein), and the like, casein (derived from milk) in modified, combined or soluble form, as well as other materials useful as adhesives in coated paper.

The indications are that the herein described processing of the pigment lessens or avoids a certain amount of dusting which has been experienced on the calenders, winders and rewinders with paper, notably that having groundwood furnishes run on high speed paper machines in which pigment comprising calcium carbonate of certain characteristics has been used as filler. Moreover, there are indications that paper made with pigment comprising calcium carbonate processed as described herein possesses a lesser degree of chalky feel than previously produced paper filled with unprocessed pigment.

Where a strong coating is referred to herein, it is meant that the coating in question shows no pick on Dennison No. 3 wax, but gives a slight pick on Dennison No. 4 wax. A good description of the wax test as applied to coated paper is given by W. A. Kirkpatrick in the "Paper Trade Journal," vol. 109, (1939), No. 12, page 36.

The oil absorption test used followed substantially the so-called "standard rub-out method" for determining the oil absorption of pigments. This type of test is described in detail in "Physical and Chemical Examination of Paints, Varnishes, Lacquers and Colors," by Henry A. Gardner, 6th edition, Oct. 1933, pages 475-7.

I have not yet determined the cause or causes of the outstanding modification of the properties of pigment comprising calcium carbonate brought about by its subjection to my process, but my theory is that it is due to some change which takes place in the surface characteristics of the individual particles. It may be that the physical, chemical, electrical, or other condition of the pigment particles has been altered. As to particles size, I have found that, after pigment comprising artificially prepared calcium carbonate maintained in its original wet condition has been processed, in some cases it appears that it may be slightly reduced in particle size as indicated by a settling test. In respect to pigment comprising artificially prepared calcium carbonate dried previous to treatment, such dried pigment normally having a lower settling test than the same pigment in its original wet condition, I have found that in some cases, after treatment, the pigment has been restored to the same settling test as the original wet pigment, indicating no change in original particle size. I have further found that the particle size of pigment comprising naturally occurring calcium carbonate in certain cases does not seem to be affected at all by my treatment, and in other cases may be affected to a minor degree, if at all. Thus there appears to be little if any reduction of particle size occurring in my process. But any reduction in particle size, if any does occur in my process, is believed to have little or no bearing on the outstanding modification of the properties noted in the pigment, as I have found that any given pigment comprising calcium carbonate does not, in general, display a change in properties such as shown herein with slight or even moderate change in particle size. In fact, so far as adhesive requirement of any given pigment comprising artificially prepared calcium carbonate is concerned, it is considered that, as a general rule, this tends to increase rather than decrease as particle size becomes smaller, and, as shown by comparison of the adhesive requirement of tests 86 and 88 of Table VII, pigments comprising naturally occurring calcium carbonate from the same source but of different degrees of fineness, in this case at any rate, do not differ in adhesive requirement.

My processed pigment comprising artificially prepared calcium carbonate, while embodying new and highly desirable characteristics such as lower adhesive requirement, lower oil absorption and the like, nevertheless retains or exhibits in an enhanced degree, the otherwise wholly desirable properties which it may have possessed prior to processing, such as its fineness of particle size, its uniformity of particle size and shape, its settling characteristics, its good opacity, good brightness, high whitening value, good covering power, softness, smoothness and lack of abrasiveness, good finishing properties, good ink receptivity, good body, good spreading and brushing characteristics, and the like; as does likewise my processed pigment comprising naturally occurring calcium carbonate, within the limitations previously mentioned herein.

As stated previously herein the slurries I employ may in some cases be very concentrated. Such very concentrated slurries sometimes are thixotropic, i. e., they may set or become apparently solid on standing, but may be restored to a liquid or some semblance of a liquid condition upon vigorous agitation. Also some of the slurries may be extremely thick up to the point where a pump may just be able to handle them. Thus where in the claims I use the word "slurry," I mean it to include mixture comprising the pigment in question and water throughout the entire range of liquidity, not only readily flowable slurries, but also extremely thick and viscous slurries up to the point where they may approach the plastic or almost pasty condition, the only limitation being the capability of a suitable pump to pump them.

As will be apparent, any rotating element, such for example as a circular saw, has an infinite number of planes of rotation which pass through the element, all of which are parallel, and at right angles to the axis of rotation of the element. When a jet or its longitudinal axis, is stated herein or in the claims to be in a plane of rotation or located in a plane of rotation of a rotating element, such for example as a circular saw, it is intended to mean that a plane of rotation of said element passes through said jet substantially parallel to the longitudinal axis of said jet.

In this specification I have advanced one or more theories as partial or complete explanation of various conditions and effects, but it is to be distinctly understood that the scope of my invention is independent of theory, and that my invention is not limited or affected by the above theories or any of them, or by their validity or invalidity, as regardless of these or any other theories, the facts are as stated herein.

By the word "element," I mean the whole unit employed, and not merely a part thereof; by the word "member," e. g. as of an "element," I mean a part thereof, either integral or connected therewith.

While machines are disclosed herein, no claims thereto are made herein, said subject matter being likewise disclosed in my copending application Serial No. 479,393, filed March 16, 1943, the subject matter of which is made a part hereof for purposes of cross reference, said copending application disclosing and claiming machines wherein a jet or jets is or are struck by a rotor element, said copending application being a continuation in part of the application of which the present application is a continuation.

While I have described in detail the preferred embodiment of my invention, it is to be understood that the details of procedure, the proportions of ingredients, the arrangement of steps, and the mechanical devices used, are presented for purposes of illustration only, and may be widely varied without departing from the spirit of my invention or the scope of the subjoined claims.

I claim:

1. In the treatment of a pigment comprising calcium carbonate, the method of modifying said pigment to effect an improvement in at least one of the properties of adhesive requirement, oil absorption, gloss-imparting quality and spreading quality of said pigment, which comprises directing a stream of slurry comprising said pigment into the path of travel of a percussive member of a rotor element, subjecting said stream of slurry to a percussion from said percussive member, said percussive member having a velocity of not less than 30 feet per second at the point of said percussion, said rotor element at the time of subjecting said stream of slurry to the action of said percussive member being free from contact with the slurry of said stream except in respect to said percussive member, the slurry of said stream being free for movement upon, and at the point of, said percussion, said slurry being propelled by said percussive member away from and out of the path of travel of said percussive member.

2. A process according to claim 1 in which said pigment comprises artificially prepared calcium carbonate.

3. A process according to claim 1 in which said slurry comprises said pigment and water, and said percussive member is swung out by centrifugal force.

4. The method of modifying a pigment comprising calcium carbonate which comprises directing a stream of slurry comprising said pigment and water into the path of travel of percussive members of a rotor element, subjecting said stream of slurry to percussions from said percussive members, said percussive members having a velocity of not less than 100 feet per second at the points of said percussions, said rotor element at the time of subjecting said stream of slurry to the action of said percussive members being free from contact with the slurry of said stream except in respect to said percussive members, the slurry of said stream being free for movement upon, and at the points of, said percussions, said slurry being propelled by said percussive members away from and out of the path of travel of said percussive members, redirecting the thus treated slurry in the form of a stream into the path of travel of said percussive members, and resubjecting it to the action of said percussive members a sufficient number of times to effect a reduction in the adhesive requirement of said pigment of not less than one-tenth of the original value of said property.

5. A process according to claim 4 in which said percussive members have a velocity of not less than 200 feet per second at the points of said percussions.

6. A process according to claim 4 in which the direction of said stream is opposed to the direction of motion of said percussive members at the points of said percussions.

7. In the treatment of a pigment comprising calcium carbonate, the method of modifying said pigment to effect an improvement in at least one of the properties of adhesive requirement, oil absorption, gloss-imparting quality and spreading quality of said pigment, which comprises subjecting a slurry comprising said pigment to blows from the teeth of a rotating circular saw, said slurry constituting at least one jet, the slurry of said jet being free to move upon, and at the point of, the striking of each such blow, and said circular saw having a peripheral velocity of not less than substantially 100 feet per second.

8. The method of modifying a pigment comprising calcium carbonate which comprises subjecting a slurry comprising said pigment and water to blows from the teeth of a circular saw rotating at a peripheral velocity of not less than substantially 100 feet per second until a reduction is effected in at least one of the properties of adhesive requirement and oil absorption of said pigment of not less than one-tenth of the original value of said property, said slurry constituting at least one jet, the longitudinal axis of said jet being located substantially in a plane of rotation of said saw, said jet being directed from beyond the periphery of said saw substantially toward the center of rotation thereof into the path of said teeth, the slurry of said jet being free to move upon, and at the point of, the striking of each such blow.

9. A process according to claim 8 in which said pigment comprises artificially prepared calcium carbonate and the peripheral velocity of said circular saw is not less than substantially 200 feet per second.

10. A process according to claim 8 in which said pigment comprises artificially prepared calcium carbonate and the peripheral velocity of said circular saw is not less than substantially 400 feet per second.

HAROLD R. RAFTON.

REFERENCES CITED

The following references are of record in the file of this patent:

UNITED STATES PATENTS

| Number | Name | Date |
|---|---|---|
| 1,530,949 | Kipper | Mar. 24, 1925 |
| 1,764,020 | Hopkins | June 17, 1930 |
| 1,872,891 | Church | Aug. 23, 1932 |
| 1,943,561 | Staley | July 6, 1933 |
| 2,081,112 | Statham et al. | May 18, 1937 |
| 2,182,096 | Roderick | Dec. 5, 1939 |
| 2,255,213 | Good | Sept. 9, 1941 |
| 2,323,877 | Turbett | July 6, 1943 |